(12) United States Patent
Dong et al.

(10) Patent No.: US 11,570,841 B2
(45) Date of Patent: *Jan. 31, 2023

(54) SYSTEM AND METHOD OF RADIO RESOURCE MANAGEMENT FOR RADIO ACCESS NETWORKS

(71) Applicant: Verizon Patent and Licensing Inc., Basking Ridge, NJ (US)

(72) Inventors: Yuexin Dong, Bridgewater, NJ (US); Nischal Patel, Gilberts, IL (US); Frank Jager, Chester, NJ (US); Ahmed Moussa, Montclair, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 59 days.

This patent is subject to a terminal disclaimer.

(21) Appl. No.: 17/307,312

(22) Filed: May 4, 2021

(65) Prior Publication Data
US 2021/0259041 A1 Aug. 19, 2021

Related U.S. Application Data

(63) Continuation of application No. 16/597,091, filed on Oct. 9, 2019, now Pat. No. 11,032,868.

(51) Int. Cl.
*H04W 76/27* (2018.01)
*H04W 76/38* (2018.01)

(52) U.S. Cl.
CPC ........... *H04W 76/27* (2018.02); *H04W 76/38* (2018.02)

(58) Field of Classification Search
None
See application file for complete search history.

(56) References Cited

U.S. PATENT DOCUMENTS

| | | |
|---|---|---|
| 2011/0312369 A1 | 12/2011 | Furuya et al. |
| 2019/0254109 A1 | 8/2019 | Lee et al. |
| 2020/0267631 A1 | 8/2020 | Yilmaz et al. |
| 2021/0007019 A1 | 1/2021 | Yang et al. |

OTHER PUBLICATIONS

"Offloading UEs in RRC_Inactive", R2-1709110, LG Electronics Inc., 3GPP TSG-RAN2 WG2 Meeting RAN2 #99 Berlin, Germany Aug. 21-25, 2017 (Year: 2017).

*Primary Examiner* — German Viana Di Prisco

(57) ABSTRACT

A system and method provide for receiving an indication that a user device has been inactive; accessing a configuration table; identifying, based on the configuration table, a number of user devices that can be in an RRC inactive state; determining a current number of user devices that are in the RRC inactive state; transitioning the user device to the RRC inactive state when the current number of user devices is less than the threshold number of user devices; determining a priority associated with the user device when the current number equals the threshold number; and transitioning the user device to the RRC inactive state or an RRC idle state based on the priority of the user device.

20 Claims, 6 Drawing Sheets

| REGULAR CELL | | | SMALL CELL | | | INDUSTRIAL IOT | |
|---|---|---|---|---|---|---|---|
| RRC_INACTIVE USER NUMBER | 200 | 502 | RRC_INACTIVE USER NUMBER | 100 | 512 | RRC_INACTIVE USER NUMBER | NO LIMIT | 522 |
| CRITERIA PRIORITY ORDER | 1. USER TYPE<br>2. USER HISTORY BEHAVIOR<br>3. SERVICE TYPE | 504 | CRITERIA PRIORITY ORDER | 1. USER HISTORY BEHAVIOR<br>2. SERVICE TYPE<br>3. USER TYPE | 514 | CRITERIA PRIORITY ORDER | N/A | 524 |
| USER TYPE ORDER | 1. ENTERPRISE FWA<br>2. CONSUMER FWA<br>3. ENTERPRISE MOBILE<br>4. CONSUMER MOBILE | 506 | USER TYPE ORDER | 1. CONSUMER FWA<br>2. CONSUMER MOBILE | 516 | USER TYPE ORDER | N/A | 526 |
| USER HISTORY BEHAVIOR ORDER | 1. VERY FREQUENTLY<br>2. FREQUENTLY<br>3. NORMAL | 508 | USER HISTORY BEHAVIOR ORDER | 1. VERY FREQUENTLY<br>2. FREQUENTLY<br>3. NORMAL | 518 | USER HISTORY BEHAVIOR ORDER | N/A | 528 |
| SERVICE/ BEARER TYPE ORDER | 1. NGBR<br>2. GBR<br>3. VOICE | 510 | SERVICE/ BEARER TYPE ORDER | 1. NGBR<br>2. GBR<br>3. VOICE | 520 | SERVICE/ BEARER TYPE ORDER | N/A | 530 |

FIG. 5A     FIG. 5B     FIG. 5C

SYSTEM AND METHOD OF RADIO RESOURCE MANAGEMENT FOR RADIO ACCESS NETWORKS

BACKGROUND INFORMATION

This patent application is a continuation of U.S. patent application Ser. No. 16/597,091, filed on Oct. 9, 2019, titled "System and Method of Radio Resource Management for Radio Access Networks" the disclosure of which is incorporated by reference herein in its entirety.

BACKGROUND INFORMATION

When a user device connects to a radio access network (RAN) operated by a wireless network provider and initiates a data session via the RAN, the user device enters into a Radio Resource Control (RRC) connected state. In current wireless networks, during periods of inactivity, the user device enters an RRC idle state, in which the user device is disconnected from the RAN. Fifth Generation (5G) New Radio (NR) introduce a third state, an RRC inactive state, in which, during periods of inactivity, the user device may still be connected to the RAN. In order to avoid overwhelming the network it may be desirable to limit the number of user devices that are able to be in the RRC inactive state at one time.

BRIEF DESCRIPTION OF THE DRAWINGS

FIGS. 5A-5C illustrate exemplary configuration tables; and

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to transitioning user devices to an RRC inactive state or an RRC idle state based on priorities associated with the user devices. Due to limited resources at a base station, all user devices connected to the base station may not be able to be in a connected state at one time. Therefore, after a period of inactivity, a user device connected to the base station may transition to an inactive state or an idle state. Because a user device is still connected to the network when in the inactive state, a user device in the inactive state may consume more resources than a user device in the idle state. In addition, both a user device and a base station may store access stratum context while in the inactive state. In order to avoid congestion at the base station, a limit or threshold may be placed on a number of user devices connected to the base station that may be in the inactive state at one time. The limit or threshold may be per base station and may be based on a cell deployment scenario.

Because user devices in the inactive state are still connected to the RAN, unlike in the idle state in which the user device is disconnected from the RAN, a user device may transition from the inactive state to the active state much faster than a user device may transition from the idle state to the active state. In addition, the inactive state may reduce latency due to a decrease in signaling and, in turn, may reduce the signaling overhead of the system. Due to the decreased latency and signaling and other factors, transitioning the user device to the inactive state may increase the battery life of the user device. Therefore, it may be advantageous for a user device to transition to the inactive state instead of the idle state during periods of inactivity. When in the inactive state, a user device may be able to select a Public Land Mobile Network (PLMN), receive system broadcast information, perform cell re-selection if the user device is mobile, receive paging messages, and perform other functions.

Since the number of user devices that may enter the inactive state may be limited, a user device may be transitioned to the inactive state based on a priority associated with the user device. For example, when the limit of user devices in the inactive state has been reached and a user device become inactive, if the user device has a low priority, the user device may be transitioned to the idle state. Similarly, if the user device has a high priority, the user device may be transitioned to the inactive state and a user device with a lower priority may be transitioned to the idle state.

Figure 1:
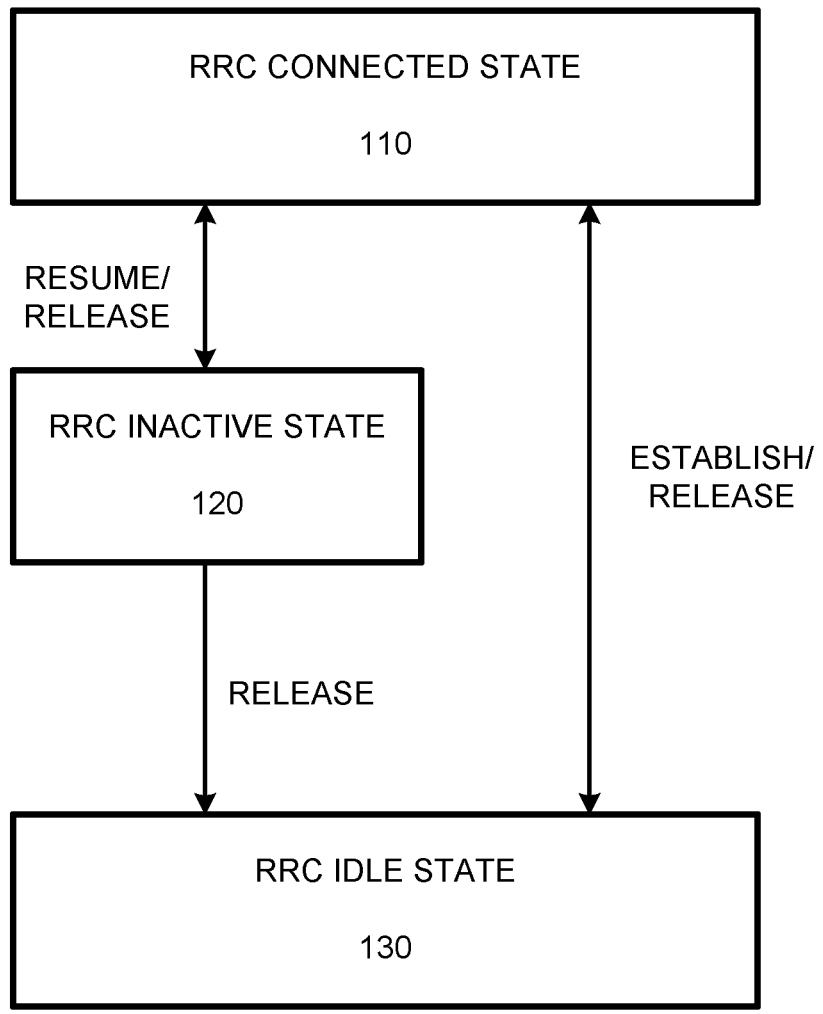
FIG. 1 is a diagram illustrating RRC states of user devices with respect to a RAN in accordance with an exemplary implementation.

FIG. 1 is a diagram illustrating an exemplary environment 100 in which a user device may transition between RRC states according to implementations herein. Environment 100 may include RRC connected state 110, RRC inactive state 120, and RRC idle state 130.

A user device may initially enter RRC connected state 110 when the user device connects to a network and begins a data session. For example, the user device may be in RRC connected state 110 when accessing content on the network, when downloading content from the network, when streaming content from the network, when there is an active data session between the user device and a base station, etc. When the user device has been inactive for a period of time, the user device may enter either RRC inactive state 120 or RRC idle state 130.

When the user device becomes inactive, a base station to which the user device is attached may determine whether a maximum number of user devices are currently in RRC inactive state 120. For example, the base station may be associated with a threshold indicating a maximum number of users in RRC inactive state 120 that the base station can support. If the threshold number of user devices in RRC inactive state 120 has not been met, the user device may enter RRC inactive state 120. When user device is in RRC inactive state 120, the user device may still be connected to the network, but the active connection may be suspended. When the user device becomes active, the user device may quickly re-enter RRC connected state 110 by resuming the connection with the network.

When the user device becomes inactive and the threshold for the number of user devices in RRC inactive state 120 for the base station has been met, a priority associated with the user device may be determined. The priority may be determined based on, for example, a user type associated with the user device, a service/bearer type associated with the user device, a user history behavior, a user mobile speed, and additional factors. A method for determining the priority for the user device will be further discussed below. If the priority determined for the user device is lower than the priorities of all of the user devices in RRC inactive state 120, the user device may transition to RRC idle state 130, in which the user device is released from the network. When the user device becomes active, the user device may establish a new connection to the network and the user device may enter RRC connected state 110.

If the priority determined for the user device is not lower than the priorities of all of the user devices in RRC inactive state 120, the user device may enter RRC inactive state 120 and the connection with the network may be suspended. In this case, since the threshold for users in RRC inactive state 120 has been met, the user device with the lowest priority that is currently in RRC inactive state 120 may be released from the network and may transition to RRC idle state 130. As shown in FIG. 1, a user device may transition between RRC connected state 110 and RRC inactive state 120 and a user device may transition between RRC connected state 110 and RRC idle state 130. In addition, the user device may transition from RRC inactive state 120 to RRC idle state 130. However, in an exemplary implementation, the user device may not transition from RRC idle state 130 to RRC inactive state 120.

Figure 2:
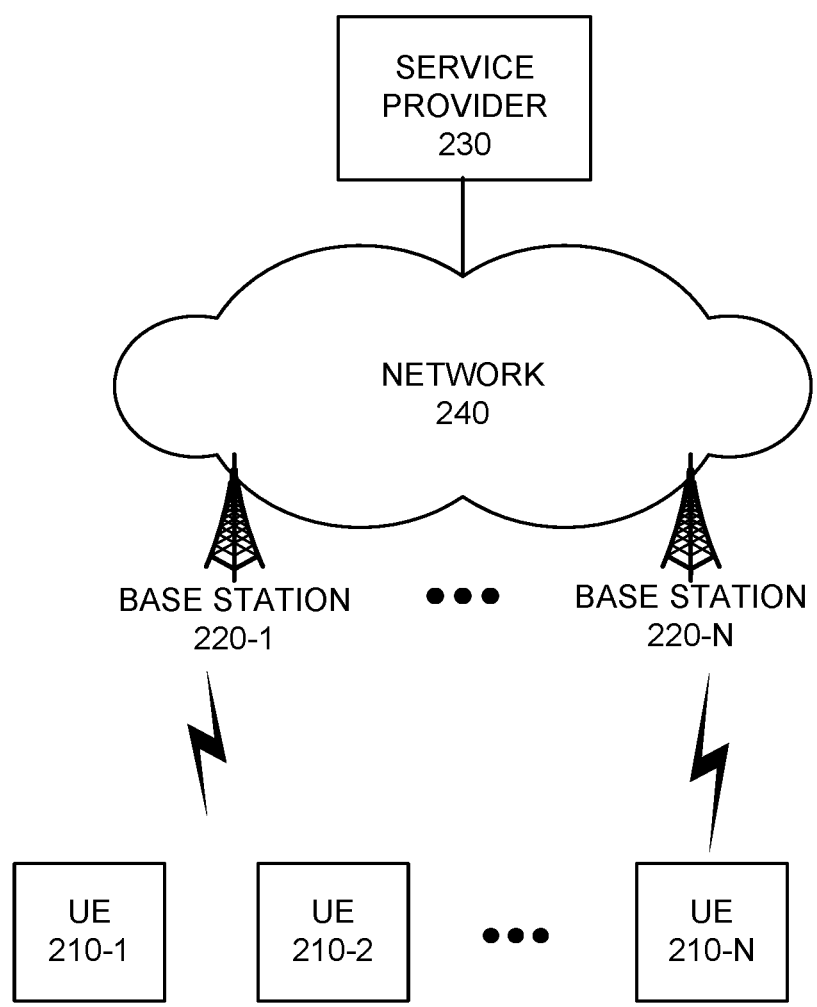
FIG. 2 illustrates an exemplary environment in which systems and methods described herein may be implemented.

FIG. 2 is a block diagram of an exemplary environment 200 in which systems and methods described herein may be implemented. Environment 200 may include user equipment (UE) 210-1 through 210-N, base stations 220-1 through 220-N, service provider 230, and network 240.

UEs 210-1 through 210-N (individually referred to as UE 210-x, UE 210 or UE device 210, and collectively as UEs 210 or UE devices 210) may include a mobile device, such as wireless or cellular telephone device (e.g., a conventional cell phone with data processing capabilities), a smart phone, a personal digital assistant (PDA) that can include a radiotelephone, etc. UEs 210 may also include any type of mobile computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, etc., that may include communication functionality. UEs 210 may further include Internet of things (IoT) devices, such as narrow band IoT devices operating in accordance with the 3GPP standard, devices employing machine-to-machine (M2M) communication, such as Machine-Type Communication (MTC), a type of M2M communication standard developed by the 3GPP.

UEs 210 may connect to network 240 via an air interface and to other devices in environment 200 (e.g., service provider 230) via any conventional technique, such as wired, wireless, optical connections or a combination of these techniques. UE 210 and the entity associated with UE 210 (e.g., the user of UE 210) may be referred to collectively as UE 210 in the description below.

As described herein, network 240 may include base stations 220-1 to 220-N (referred to herein collectively as "base stations 220" and individually as "base station 220"). Each base station 220 may service a set of UEs 210. For example, base station 220-1 may service UEs 210-1 and 210-2, and base station 220-N may service UE 210-N. Base station 220 may include a 5G base station (e.g., a next generation node B (gNodeB)) that includes one or more radio frequency (RF) transceivers (also referred to as "cells" and/or "base station sectors") facing particular directions. For example, base station 220 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 210 and may simultaneously generate up to k antenna beams. A particular antenna beam may service multiple UEs 210. In some implementations, base station 220 may also include a Fourth Generation (4G) base station (e.g., an evolved NodeB (eNodeB)).

Service provider 230 may include one or more computer devices and systems associated with providing wireless services via network 240. For example, service provider 230 may be an entity associated with network 240. Service provider 230 may maintain information regarding service plans for large numbers of users (also referred to herein as customers or subscribers) and manage network resource usage by the users. For example, service provider 230 may store user profiles that include criteria associated with each UE 210. The criteria may enable the RAN to determine priorities associated with UEs 210.

Network 240 may include one or more wired, wireless and/or optical networks that are capable of receiving and transmitting data, voice and/or video signals. For example, network 240 may include one or more public switched telephone networks (PSTNs) or other type of switched network. Network 240 may also include one or more wireless networks and may include a number of transmission towers for receiving wireless signals and forwarding the wireless signals toward the intended destination. Network 240 may further include one or more satellite networks, one or more packet switched networks, such as an Internet protocol (IP) based network, a local area network (LAN), a wide area network (WAN), a personal area network (PAN), a long term evolution (LTE) network, a 4G network, a next generation, e.g., (5G) network, a WiFi network, a Bluetooth network, an intranet, the Internet, or another type of network that is capable of transmitting data. Network 240 provides wireless packet-switched services and wireless Internet protocol (IP) connectivity to UEs 210 to provide, for example, data, voice, and/or multimedia services.

The exemplary configuration illustrated in FIG. 2 is provided for simplicity. It should be understood that a typical environment 200 may include more or fewer devices than illustrated in FIG. 2. For example, environment 200 may include a large number (e.g., thousands or more) of UEs 210 and multiple service providers 230. In addition, network 240 may include additional elements, such as eNBs, gNBs, base stations, switches, gateways, routers, monitoring devices, etc., that aid in routing data and determining whether to grant/deny prioritized access to network resources, as described in detail below.

In addition, various functions are described below as being performed by particular components in environment 200. In other implementations, various functions described as being performed by one device may be performed by another device or multiple other devices, and/or various functions described as being performed by multiple devices may be combined and performed by a single device.

Figure 3:
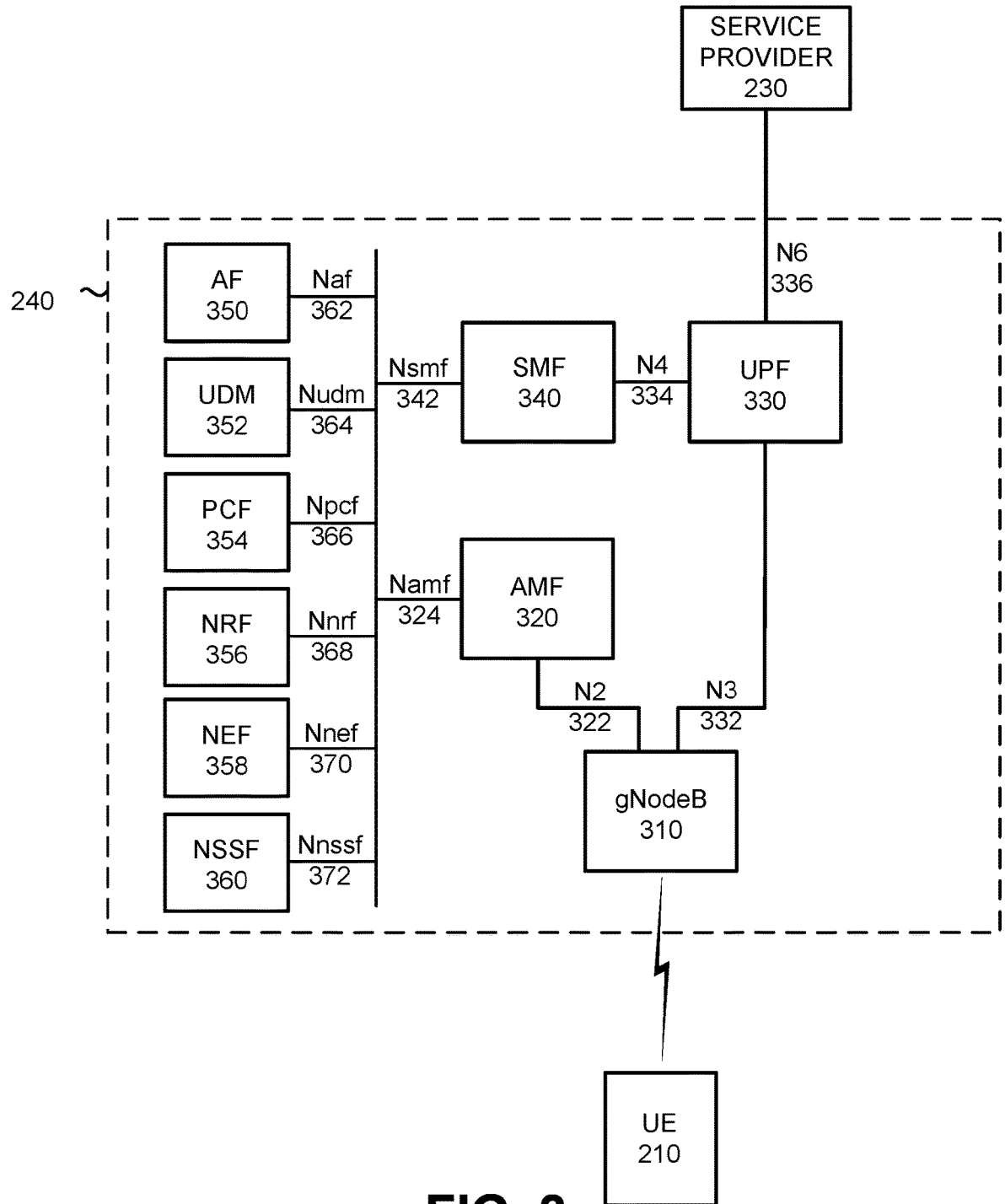
FIG. 3 illustrates an exemplary configuration of components implemented in a portion of the network of FIG. 2.

FIG. 3 is an exemplary block diagram illustrating a portion of network 240. In the implementation depicted in FIG. 3, network 240 is a next generation network, such as a 5G network, which includes a NR core network.

Network 240 may include a gNodeB 310 (corresponding to base station 220), an Access and Mobility Management Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 310, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, NEFs 358, and NSSFs 360.

gNodeB 310 may include one or more devices (e.g., base stations) and other components and functionality that enable UE 210 to wirelessly connect to network 240 using 5G NR Radio Access Technology (RAT). For example, gNodeB 310 may include one or more cells, with each cell including a wireless transceiver with an antenna array configured for millimeter-wave wireless communication. gNodeB 310 may implement one or more RAN slices to partition network 240. gNodeB 310 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE 210 and an SMS function (not shown in FIG. 3), session management messages transport between UE 210 and SMF 340, access authentication and authorization, location services management, functionality to support non-3GPP access networks, and/or other types of management processes. In some implementations, AMF 320 may implement some or all of the functionality of managing RAN slices in gNodeB 310 and network 240. AMF 320 may be accessible by other function nodes via a Namf interface 324.

UPF 330 may maintain an anchor point for intra/inter-RAT mobility, maintain an external Packet Data Unit (PDU) point of interconnect to a data network, perform packet routing and forwarding, perform the user plane part of policy rule enforcement, perform packet inspection, perform lawful intercept, perform traffic usage reporting, enforce quality of service (QoS) policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to service provider 230 via a WAN using an N6 interface 336.

SMF 340 may perform session establishment, modification, and/or release, perform Internet Protocol (IP) address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for UE 210, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities, events, and/or status to other NFs, including third party NFs, AFs, edge computing NFs, and/or other types of NFs. For example, NEF 358 may provide capabilities and events/status of UE 210 to other devices/elements in network 240. Furthermore, NEF 358 may secure provisioning of information from external applications to network 240, translate information between network 240 and devices/networks external to access network 120, support a Packet Flow Description (PFD) function, and/or perform other types of network exposure functions. NEF 358 may be accessible via Nnef interface 370.

NSSF 360 may select a set of network slice instances to serve a particular UE 210, determine network slice selection assistance information (NSSAI), determine a particular AMF 320 to serve a particular UE 210, and/or perform other types of processes associated with network slice selection or management. In some implementations, NSSF 360 may implement some or all of the functionality of managing RAN slices in gNodeB 310 and network 240. NSSF 360 may be accessible via Nnssf interface 372.

Although FIG. 3 shows exemplary components of network 240, in other implementations, network 240 may include fewer components, different components, differently arranged components, or additional components than depicted in FIG. 3. Additionally or alternatively, one or more components of network 240 may perform functions described as being performed by one or more other components of network 240. For example, network 240 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, network 240 may include a reference point architecture that includes point-to-point interfaces between particular function nodes.

Figure 4:
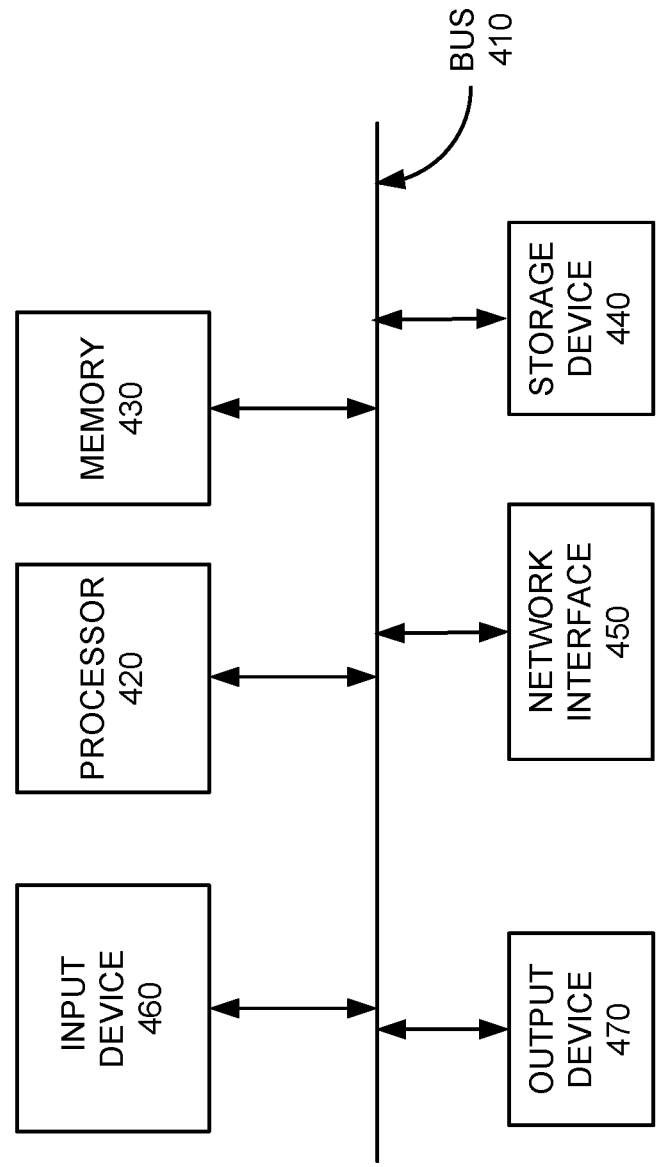
FIG. 4 illustrates an exemplary configuration of logic components included in one or more of the devices of FIG. 2 and FIG. 3.

FIG. 4 is a block diagram showing exemplary components of a network device 400 according to an embodiment. Network device 400 may include one or more network elements illustrated in FIG. 2 and/or FIG. 3, such as, for example, UE 210, base station 220, server provider 230, AMF 320, SMF 340, UDM 352, and/or NEF 358, etc. In some embodiments, there may be a plurality of network devices 400 providing functionality of one or more network elements. Alternatively, one network device 400 may perform the functionality of any plurality of network elements. Network device 400 may include a bus 410, a processor 420, a memory 430, storage device 440, a network interface 450, input device 460, and an output device 470.

Bus 410 provides a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may use any operating system, which may include varieties of the Windows, UNIX, and/or Linux operating systems. Processor 420 may also use high-level analysis software packages and/or custom software written in any programming and/or scripting languages for interacting with other network entities that are communicatively coupled to network 240.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 210.

Network interface 450 may include a transceiver that enables network device 400 to communicate with other devices and/or systems in network environment 200. Network interface 450 may be configured to exchange data with devices via wired communications (e.g., conductive wire, twisted pair cable, coaxial cable, transmission line, fiber optic cable, and/or waveguide, etc.), or a combination of wired and wireless communications. In other embodiments, network interface 450 may interface with network 240 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth© wireless interface, an radio frequency identification device (RFID) interface, a near field communications (NFC) wireless interface, and/or any other type of interface that converts data from one form to another form.

As described below, network device 400 may perform certain operations relating to communicating from service provider 230 to UEs 210. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the flows charts in FIG. 6.

Although FIG. 4 shows exemplary components of network device 400, in other implementations, network device 400 may include fewer components, different components, additional components, or differently arranged components than depicted in FIG. 4.

FIGS. 5A-5C illustrate exemplary configuration tables used to determine a priority associated with UE 210. In one implementation, the configuration tables may be stored at base station 220. FIG. 5A illustrates a configuration table corresponding to a regular or standard cell, FIG. 5B illustrates a configuration table corresponding to a small cell, and FIG. 5C illustrates a configuration table corresponding to an industrial IoT cell. A regular or standard cell may correspond to a typical or standard 5G cell. And industrial IoT cell may be configured to receive and/or support a large number of IoT devices.

Row 502 of FIG. 5A may correspond to the RRC_INACTIVE user number. The RRC_INACTIVE user number may indicate a capability or threshold of base station 220 for a regular cell. For example, row 502 of FIG. 5A illustrates that the RRC_INACTIVE user number may be 200, which indicates that the maximum number of inactive users that base station 220 can support for a regular cell may be 200. As shown in row 512 of FIG. 5B, for the small cell, the RRC_INACTIVE number that base station 220 can support may be 100. For an industrial IoT cell, IoT devices may be instructed to wake up as soon as possible when the IoT devices are not in RRC connected state 110. Therefore, as shown in row 522 in FIG. 5C, for an industrial IoT cell, there may be no limit on the RRC_INACTIVE user number that base station 220 can support. The numbers shown in FIGS.

5A-5C are exemplary and each base station 220 may store different configuration tables with different RRC_INACTIVE user numbers.

When the RRC_INACTIVE user number has been reached and an additional UE 210 attempts to enter RRC inactive state 120, base station 220 may determine which UE 210 to transfer to RRC idle state 130 based on priorities associated with UEs 210. A priority associated with UE 210 may be determined based on a number of factors. For example, the priority may be based on a user type associated with UE 210, a service/bearer type associated with UE 210, a user history behavior associated with UE 210, a user mobile speed associated with UE 210, a subscription or plan level associated with UE 210, and/or additional predefined rules or criteria. Base station 220 may determine the user type, service/bearer type, user history behavior, user mobile speed associated UE 210, and other factors and may calculate a priority for a user based on these factors.

The user type may indicate the type of device associated with UE 210 and how UE 210 connects to the network. For example, the user type may indicate that UE 210 is a mobile device, a mobile computer device, an IoT device, or another type of device. In addition, the user type may indicate that UE 210 connects to the network via a wireless network, a mobile hotspot, WiFi, or another means.

The service/bearer type may indicate what type of service UE 210 most recently used. For example, the service/bearer type may indicate that a user associated with UE 210 currently subscribes to a voice service, a data service, a web browsing service, a guaranteed bit rate (GBR) service, a non-guaranteed bit rate (NGBR) service, a combination of different services, or another type of service.

The user history behavior may indicate how frequently UE 210 attaches to a new base station 220. For example, the user history behavior may indicate that a user of UE 210 changes locations frequently and, therefore, UE 210 may be handed over to new base stations 220 frequently. As another example, the user history behavior may indicate that a user of UE 210 is stationary for a majority of the day and UE 210 is frequently attached to only one or two base stations 220 during a typical day.

The user mobile speed may indicate how fast UE 210 is traveling. For example, based on a frequency between base station 220 handovers and based on a location of base stations 220, base station 220 may determine whether or not the user of UE 210 is a high speed, traveling user. In one example, if the handover speed between base stations 220 is quick and base stations 220 are located near a highway, base station 220 may determine that UE 210 is traveling in a vehicle on a highway at a fast speed. In another example, if base station 220 is near a home or an office of a user and UE 210 does not attach to new base stations 220 frequently, base station 220 may determine that a user of UE 210 is not a high speed traveling user.

Base stations 220 may place a priority order on the criteria when determining a priority for UE 210. For example, base station 220 may weigh different criteria more heavily when determining a priority for UE 210. Row 504 of FIG. 5A may indicate a criteria priority order for base station 220. The criteria priority order may indicate the order of the criteria that base station 220 will use to rank UE 210. For example, the criteria order may indicate which criteria is weighed most heavily when determining the priority for UE 210. As shown in row 504 of FIG. 5A, for the regular cell, the most heavily weighted factor when determining a priority for UE 210 may be the user type, followed by user history behavior, and service type. As shown in row 514 of FIG. 5B, for the small cell, the most heavily weighted factor when determining the priority for UE 210 may be the user history behavior, followed by the service type and the user type. The small cell may correspond to, for example, a shopping mall, an office, or a different small space. The criteria priority order for the small cell may be different than the criteria priority order of the regular cell because each base station 220 may serve different customers. Therefore, the criteria priority level may change based on where a UE 210 is located. As shown in row 524 of FIG. 5C, since the industrial IoT cell may be able to support an unlimited number of RRC inactive UEs 210, the base station 220 may not determine a priority for UEs 210. The criteria priority orders shown in FIGS. 5A-5C are exemplary and different criteria priority orders may be stored for different base stations 220.

The user type order may indicate a priority order per user type. For example, row 506 of FIG. 5A illustrates that, for the particular regular cell, enterprise fixed wireless access (FWA) users may have the highest priority, consumer FWA users may have the second highest priority, enterprise mobile users may have the third highest priority, and consumer mobile users may have the fourth highest priority. In this example, the FWA users may have higher priorities than the mobile users because the FWA users do not move as frequently as the mobile users and the base station 220 may not be required to continuously store new information associated with the FWA users. In addition, the enterprise users may have a higher demand for services, so the enterprise users may have a higher priority than the consumer users. As shown in row 516 of FIG. 5B, for the particular small cell, the consumer FWA users may have the highest priority, followed by the consumer mobile users. As shown in row 526 of FIG. 5C, since the base station 220 may be able to support an unlimited number of RRC inactive UEs 210 in an industry IoT cell, base station 220 may not determine a priority for UEs 210. The user type orders shown in FIGS. 5A-5C are exemplary and different user type orders may be stored for different base stations 220.

The user history behavior priority may indicate a priority of the different user history behaviors. As shown in row 508 of FIG. 5A and in row 518 of FIG. 5B, for the particular regular cell and small cell, UEs 210 that connect to the network very frequently (e.g., 10 times or more per minute) may have the highest priority, followed by UEs 210 that connect to the network frequently (e.g., between 3 and 10 times per minute) and UEs 210 that connect to the network at a normal rate (e.g., 1 time or less per minute). As shown in row 528 of FIG. 5C, since the industrial IoT cell may be able to support an unlimited number of RRC inactive UEs 210, the base station 220 may not determine a priority for UEs 210. The user history behavior orders shown in FIGS. 5A-5C are exemplary and different user history behavior orders may be stored for different base stations 220.

The service/bearer type order may indicate the priority order for the last service/bearer associated with UE 210. As shown in row 510 of FIG. 5A and row 520 of FIG. 5B, for the particular regular cell and small cell, NGBR service customers may have the highest priority, GBR service customers may have the second highest priority, and voice customers may have the third highest priority. As shown in row 530 of FIG. 5C, since the industrial cell may be able to support an unlimited number of RRC inactive UEs 210, the base station 220 may not determine a service/bearer type order or priority for UEs 210. The service/bearer type orders shown in FIGS. 5A-5C are exemplary and different service/bearer type orders may be stored for different base stations 220.

The configuration tables shown in FIGS. 5A-5C may be updated based on collected data. For example, a prediction model in the self-organizing networks (SON) may update a configuration table (e.g., one or more of configuration tables shown in FIGS. 5A and 5B) based on historical data and patterns associated with the network. For example, if a user with a particular user history consistently experiences poor service, base station 220 may adjust the criteria priority order so that the user history behavior is the first priority in the criteria priority order. In this way, base station 220 may be able to adjust parameters of the configuration table without user intervention based on previous network data. For example, the network may be able to adjust the configuration tables using machine learning. In this way, based on customer feedback and measured network performance, the network may adjust the configuration table to achieve the most efficient network with the highest customer satisfaction.

Figure 6:
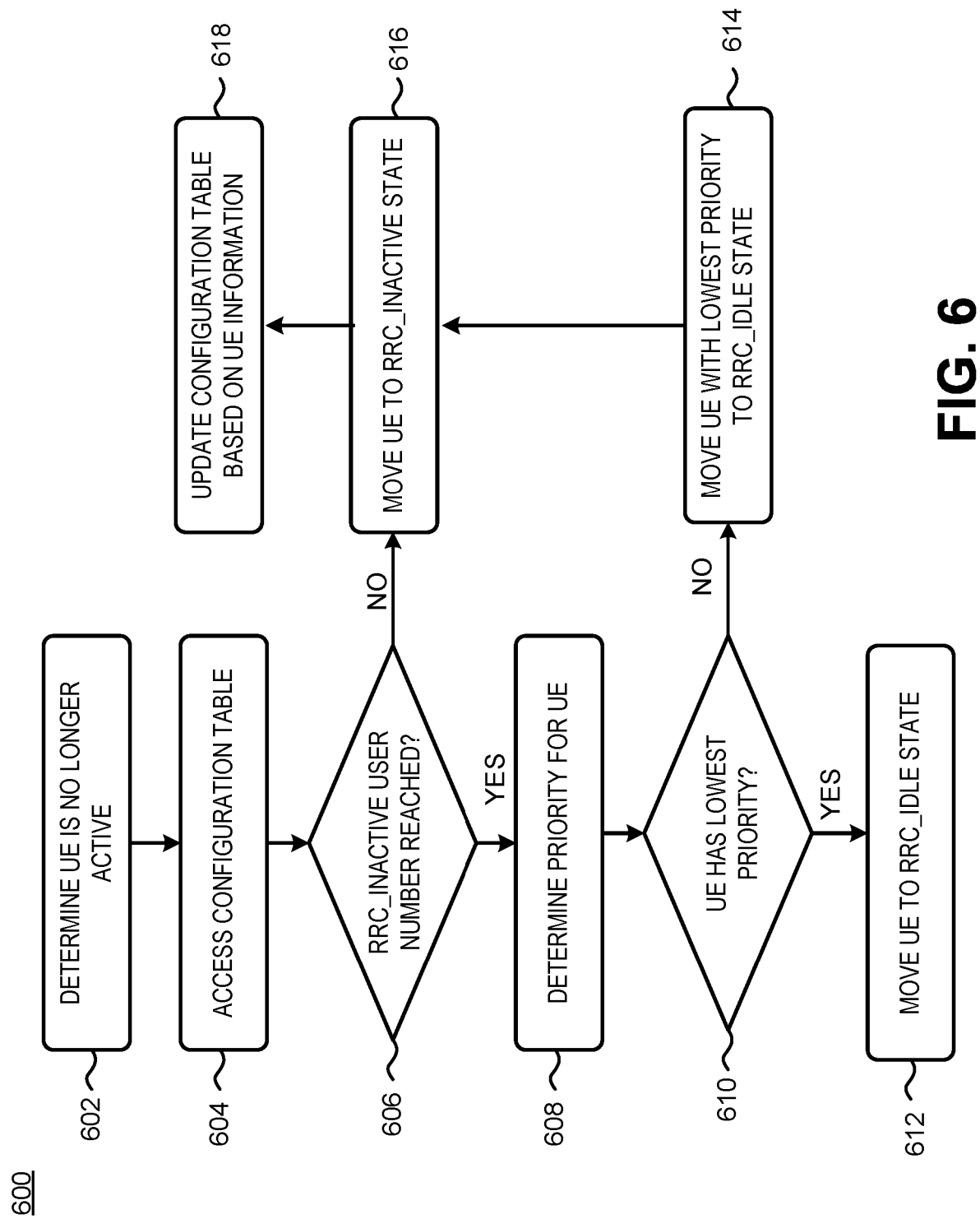
FIG. 6 is a flow diagram illustrating processing associated with radio resource management in accordance with an exemplary implementation.

FIG. 6 is a flow chart illustrating an exemplary process 600 for determining whether to transition UE 210 to RRC inactive state 120 or RRC idle state 130. In one implementation, process 600 may be performed by base station 220.

Process 600 may begin by determining that UE 210 is no longer active (block 602). For example, base station 220 may determine that there has been no active data session between the UE 210 and a base station 220 for a period of time. A configuration table associated with a cell where UE 210 is located may be accessed or identified (block 604). In one implementation, based on the type of cell associated with a current location of UE 210, base station 220 may access a corresponding configuration table. As an example, if UE 210 is located in a regular cell, base station 220 may access a configuration table similar to the configuration table shown in FIG. 5A. As another example, if UE 210 is located in a small cell (e.g., at a shopping mall, an amusement park, an office, etc.), base station 220 may identify a configuration table similar to the configuration table shown in FIG. 5B.

Process 600 may continue by determining whether the RRC_INACTIVE user number has been reached for the particular cell (block 606). For example, base station 220 may look up the RRC_INACTIVE user number in the configuration table and compare the maximum number of UEs 210 that can be in RRC inactive state 120 with a current number of UEs 210 currently in RRC inactive state 120. If the current number of UEs 210 in RRC inactive state 120 is less than the RRC_INACTIVE user number (block 606—no), base station 220 may transition UE 210 to RRC inactive state 120 (block 616). In this implementation, if the RRC_INACTIVE user number has not been reached, base station 220 may not have reached its maximum capacity for UEs 210 in RRC inactive state 210, so UE 210 may transition to RRC inactive state 210.

If the current number of UEs 220 in RRC inactive state 120 is equal to the RRC_INACTIVE user number (block 606—yes), then base station 220 may determine a priority for UE 210 (block 608). For example, base station 220 may determine parameters associated with UE 210 and may calculate a priority based on the parameters and the configuration table. In one implementation, base station 220 may determine a user type, a service/bearer type, a user history behavior, and a user mobile speed associated with UE 210. Based on the configuration table, base station 220 may determine a priority for UE 210 based on the criteria and weights associated with the criteria. For example, if UE 210 is located in a regular cell and UE 210 is a consumer mobile user with a NGBR service and connects to the network frequently, base station 220 may determine a priority associated with UE 210 using the configuration table shown in FIG. 5A. In this example, base station 220 may determine that, based on the configuration table shown in FIG. 5A, a consumer mobile user may have a priority of 4, a user who accesses the network frequently may have a priority of 2, and an NGBR user may have a priority of 1. In addition, based on FIG. 5A, base station 220 may determine that the user type priority is given the largest weight (e.g., 50%) when determining a priority for UE 210, followed by the user history behavior (e.g., 30%), and the service type (e.g., 20%). Based on parameters associated with UE 210 and the information in the configuration table, base station 220 may calculate a priority for UE 210.

Continuing with process 600, base station 220 may determine if UE 210 has a lower priority than the priorities of each UE 210 associated with base station 220 that are in the RRC inactive state 120 (block 610). For example, base station 220 may compare the priority calculated for UE 210 with the priorities calculated for the other UEs 210 in RRC inactive state 120. In one implementation, the priorities for UEs 210 may be calculated and stored for each UE 210 at the time when each UE 210 transitions to RRC inactive state 120. If UE 210 has the lowest priority (block 610—yes), base station 220 may transition UE 210 to RRC idle state 130. Since base station 220 has reached the maximum number of UEs in RRC inactive state 120, base station 220 may transition UE 210 with the lowest priority to RRC idle state 130. In this example, since UE 210 has the lowest priority, base station 220 may transition UE 210 to RRC idle state 130.

If UE 210 does not have the lowest priority (block 610—no), the UE 210 with the lowest priority may be transitioned to RRC idle state 130 (block 614) and UE 210 may be transitioned to RRC inactive state 120 (block 616). In this example, since a different UE 210 has the lowest priority, UE 210 may be transitioned to RRC inactive state 120 and the lowest priority UE 210 may be transitioned from RRC inactive state 120 to RRC idle state 130.

Process 600 may continue by updating the configuration table based on information associated with UE 210 and other UEs (block 618). For example, based on factors such as network performance and user experience, the configuration table may be updated based on the parameters associated with UE 210. Based on machine learning, the network may adjust the parameters and the order of the parameters in the configuration table to achieve an efficient network with a high level of customer satisfaction. The system may continue to adjust the parameters as additional UEs 210 transition between states 110, 120, and 130 and additional information about UEs 210 is obtained. In this way, the model may become "smarter" over time and more adjustable to provide a more efficient network and a higher level of customer satisfaction.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, at a base station, an indication that a user device associated with the base station has been inactive for a period of time;
   determining, by the base station, that a number of second user devices that are in a Radio Resource Control (RRC) inactive state equals a threshold number of user devices, wherein the threshold number is associated with the base station;
   determining, by the base station, a first priority associated with the user device and a second priority associated with each second user device of the second user devices; and
   transitioning, by the base station, the user device to the RRC inactive state when the first priority associated with the user device is higher than each second priority.

2. The method of claim 1, further comprising:
   transitioning the user device to an RRC idle state when the first priority associated with the user device is lower than each second priority.

3. The method of claim 1, wherein transitioning the user device to the RRC inactive state further comprises:
   transitioning the second user device with a lowest second priority to an RRC idle state.

4. The method of claim 1, wherein the first priority associated with the user device is based on at least one of a user type associated with the user device, a service or bearer type associated with the user device, a user history behavior associated with the user device, or a user mobile speed associated with the user device.

5. The method of claim 1, wherein determining the first priority associated with the user device comprises:
   determining a plurality of third priorities, wherein each third priority corresponds to a parameter associated with the user device;
   assigning a weight to each third priority; and
   determining the first priority based on the weighted third priorities.

6. The method of claim 1, wherein the threshold number is based on a capacity associated with the base station.

7. The method of claim 1, wherein the threshold number is based on a size or type of a cell associated with the base station.

8. A system comprising:
   one or more processors configured to:
      receive an indication that a user device associated with a base station has been inactive for a period of time;
      determine that a number of second user devices that are in a Radio Resource Control (RRC) inactive state equals a threshold number of user devices, wherein the threshold number is associated with the base station;
      determine a first priority associated with the user device and a second priority associated with each second user device of the second user devices; and
      transition the user device to the RRC inactive state when the first priority associated with the user device is higher than each second priority.

9. The system of claim 8, wherein the one or more processors are further configured to:
   transition the user device to an RRC idle state when the first priority associated with the user device is lower than each second priority.

10. The system of claim 8, wherein, when transitioning the user device to the RRC inactive state, the one or more processors are further configured to:
    transition the second user device with a lowest second priority to an RRC idle state.

11. The system of claim 8, wherein the first priority associated with the user device is based on at least one of a user type associated with the user device, a service or bearer type associated with the user device, a user history behavior associated with the user device, or a user mobile speed associated with the user device.

12. The system of claim 8, wherein, when determining the first priority associated with the user device, the one or more processors are further configured to:
  determine a plurality of third priorities, wherein each third priority corresponds to a parameter associated with the user device;
  assign a weight to each third priority; and
  determine the first priority based on the weighted third priorities.

13. The system of claim 8, wherein the threshold number is based on a capacity associated with the base station.

14. The system of claim 8, wherein the threshold number is based on a size or type of a cell associated with the base station.

15. A non-transitory computer-readable medium to store instructions, the instructions comprising:
  one or more instructions that, when executed by a processor, cause the processor to:
    receive an indication that a user device associated with a base station has been inactive for a period of time;
    determine that a number of second user devices that are in a Radio Resource Control (RRC) inactive state equals a threshold number of user devices, wherein the threshold number is associated with the base station;
    determine a first priority associated with the user device and a second priority associated with each second user device of the second user devices; and
    transition the user device to the RRC inactive state when the first priority associated with the user device is higher than each second priority.

16. The non-transitory computer-readable medium of claim 15, wherein the instructions further comprise one or more instructions that cause the processor to:
  transition the user device to an RRC idle state when the first priority associated with the user device is lower than each second priority.

17. The non-transitory computer-readable medium of claim 15, wherein the one or more instructions that cause the processor to transition the user device to the RRC idle state comprise one or more instructions that cause the processor to transition the second user device with a lowest second priority to an RRC idle state.

18. The non-transitory computer-readable medium of claim 15, wherein the first priority associated with the user device is based on at least one of a user type associated with the user device, a service or bearer type associated with the user device, a user history behavior associated with the user device, or a user mobile speed associated with the user device.

19. The non-transitory computer-readable medium of claim 15, wherein the one or more instructions that cause the processor to determine the first priority associated with the user device comprise one or more instructions that cause the processor to:
  determine a plurality of third priorities, wherein each third priority corresponds to a parameter associated with the user device;
  assign a weight to each third priority; and
  determine the first priority based on the weighted third priorities.

20. The non-transitory computer-readable medium of claim 15, wherein the threshold number is based on a capacity associated with the base station.

* * * * *